United States Patent Office 2,810,366
Patented Oct. 22, 1957

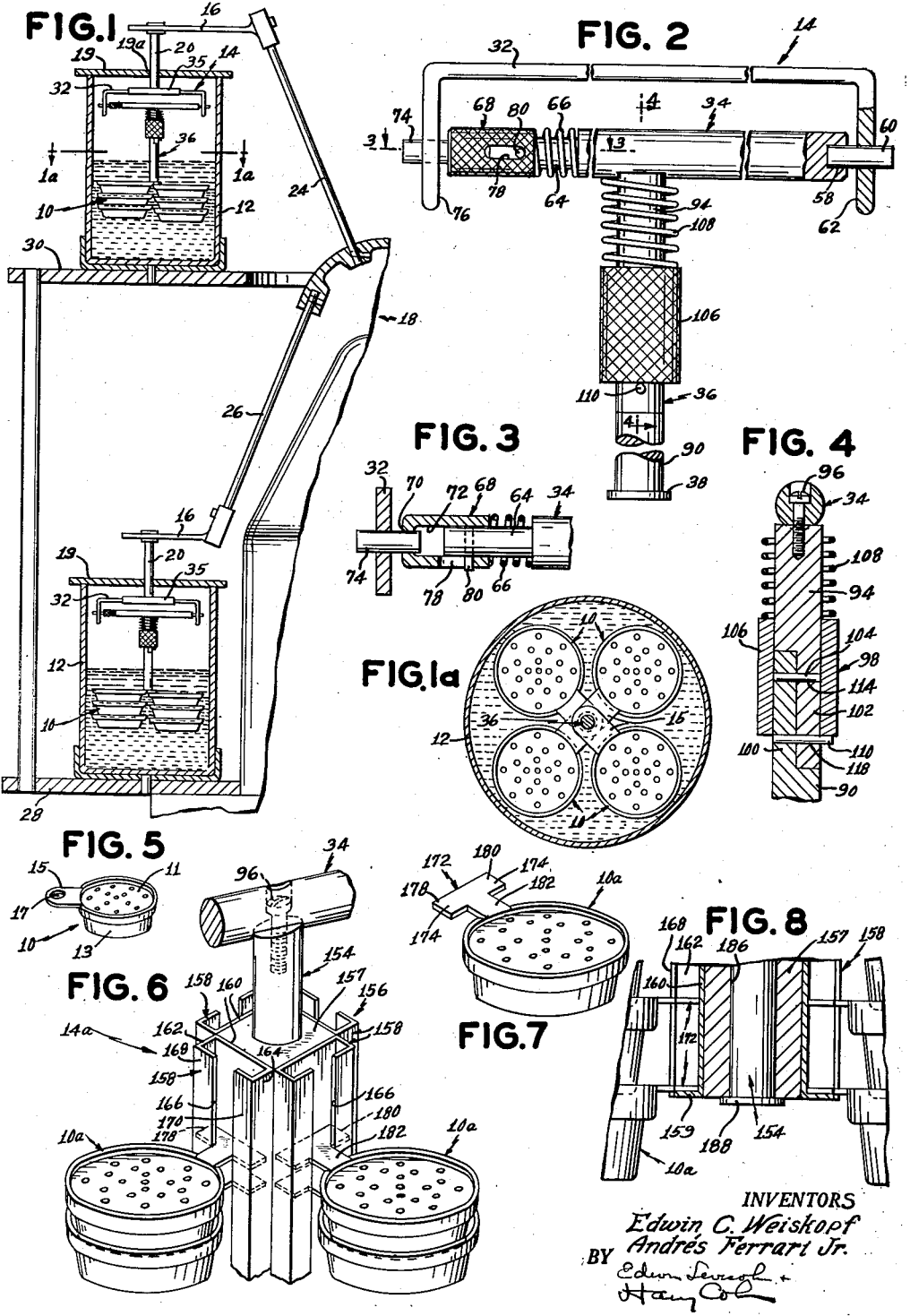

2,810,366

RECEPTACLE CARRIER FOR TISSUE PROCESSING

Edwin C. Weiskopf, Brewster, and Andrés Ferrari, Jr., Uniondale, N. Y., assignors to Technicon International Ltd., New York, N. Y., a corporation of New York Application April 14, 1954, Serial No. 423,187

6 Claims. (Cl. 118—503)

This invention relates to automatic immersion apparatus and more particularly to means for releasably supporting a material holder, or a plurality of material holders on the conveyor of such apparatus.

Automatic immersion apparatus of the type to which the present invention relates is shown in our U. S. patent application Serial No. 358,812, filed June 1, 1953, now Patent No. 2,741,221.

The present invention may also be used with automatic immersion apparatus of the type shown in U. S. Patent Nos. 2,341,197 and 2,341,198 issued on February 8, 1944, to Edwin C. Weiskopf, a joint inventor herein, and in U. S. Patent No. 2,583,379 issued on January 22, 1952, to Nelson G. Kling. Said application and patents are all owned by the assignee of this application.

In the operation of the automatic immersion apparatus of the character disclosed in said application and patents, a basket for a plurality of material holders is moved into and out of each of a plurality of receptacles, in succession, with intervening intervals during which the material holders are positioned within the receptacles, respectively, for subjecting the material such as human or animal tissue to the action of various processing liquids provided in each of said receptacles, and provision is made for reciprocating, turning or rotating the material while in the receptacles in order to improve the action of the liquids on the material.

One object of the present invention is to provide an improved carrier for the material holders especially of the type disclosed and claimed in United States patent application Serial No. 423,186 of Edwin C. Whitehead, now Patent No. 2,783,180, filed concurrently herewith, and assigned to the assignee of this application.

Another object of the present invention is to provide an improved carrier for the material holders constructed and arranged to enable the material holders to be readily attached to and removed from the carrier when desired.

Another object is the provision of a novel carrier suitable for carrying a plurality of material holders in such manner as to afford proper access of the processing liquid to the tissue or other material in said holders.

Another object is to provide an improved carrier for the material holder for rotating, turning or for vertically reciprocating the latter in the processing liquid in the receptacle.

The above objects of the invention and other objects ancillary thereto will be fully understood from the following description considered in connection with the accompanying drawings, which are to be considered as illustrative of the invention but not in limitation thereof.

In the drawings:

Fig. 1 is a vertical sectional view, partly in elevation of a portion of immersion apparatus provided with material-holder carriers embodying the presently preferred form of the invention;

Fig. 1a is a sectional view on the line 1a—1a of Fig. 1;

Fig. 2 is a side view of the carrier shown in Fig. 1;

Fig. 3 is a detail sectional view taken on line 3—3 of Fig. 2;

Fig. 4 is a sectional view taken on line 4—4 of Fig. 2;

Fig. 5 is a perspective view of a material holder having a complementary portion adapted for engagement with the carrier illustrated in Fig. 2;

Fig. 6 is a perspective view of a material-holder and carrier showing another embodiment of the invention;

Fig. 7 is a material holder of the form shown in Fig. 6; and

Fig. 8 is a view, partly in elevation and partly in section of the bottom portion of the carrier and holders shown in Fig. 6.

Referring now to the drawings in detail, Fig. 1 illustrates the plurality of material holders generally indicated at 10, positioned in both the liquid receptacles 12. Said holders are preferably, but not necessarily, of the type disclosed in the above-mentioned application of Edwin C. Whitehead filed concurrently herewith. Briefly described, said material holders 10 are small containers which are provided with removable covers 11. The receptacle-body 13 of the container has a perforated bottom and the cover 11 is also preferably perforated so that the liquid in receptacle 12 can readily pass into and out of the container for treating the tissue or other material therein. The body 13 of the container is provided with an ear or extension 15 having an aperture 17 for mounting the holder 10 on the carrier 14.

The carrier 14 is connected to the arm 16 of the conveyor of the immersion apparatus 18 by means of spindles 20. Said arm 16 is connected to the conveyor 18 by arm 24 for the receptacles on the upper receptacle support 30 of the apparatus and by an arm 26 for the receptacles on the lower support 28 of the apparatus. This immersion apparatus is shown and described in detail in the above mentioned United States Patent 2,583,379 and in our above mentioned United States application Serial No. 358,812. As described in said patent and application, the conveyor is operable to move the material holder into and out of a plurality of receptacles 12 in succession and as described in said application said conveyer is also operable to repeatedly reciprocate the tissue holder in the liquid in each receptacle during the period of treatment. As this apparatus itself is not per se part of the present invention further description thereof is considered unnecessary. Also, it will be understood that the apparatus may be of other constructions, although the apparatus which is provided with means for reciprocating the tissue while the latter is in the receptacle 12 is preferred. Also, it will be understood that the apparatus may have only one receptacle support, for example, as in U. S. Patent 2,341,198. The cover 13 for the receptacle in which the material holders are positioned for treatment are automatically raised up from the top of the receptacle when the material holders are raised out of the receptacle and is lowered onto the next receptacle when the material holders are lowered into the latter, as hereinafter described.

Referring now more particularly to Figs. 2–5, which illustrate the presently preferred mode of practicing our invention, the carrier 14 includes a substantially U-shaped member 32 for supporting a cross-bar 34 substantially transversely to spindle 20. Cross-bar 34 carries a vertical rod 36 having a flange 38 at its lower end. Member 32 is supported by member 35 which is carried by spindle 20. The holders 10 are mounted on this rod which projects through the apertures 17 in the ears of said holders. Said holders may be arranged in a plurality of stacks disposed laterally of each other as illustrated in Figs. 1 and 1a. Flange 38 supports the lowermost material holder and the others are stacked with their ears disposed one above the other on rod 36.

Cross bar 34 is provided at one end with an aperture 58 for engagement with pin 60 which is secured in end portion 62 of U-shaped member 32. The other end of cross bar 34 is provided with a portion of reduced diameter 64, as best seen in Figs. 2 and 3, upon which is provided a compression spring 66. A knurled member or sleeve 68 is provided having an aperture 70 at one end thereof. Said sleeve 68 is also provided with an internal bore 72 of a diameter substantially equal to the diameter of reduced portion 64 of cross-bar 34, whereby to permit knurled member 68 to be engaged with and longitudinally movable along reduced portion 64 of cross-bar 34. Aperture 70 is adapted for engagement with pin 74, which is secured to end portion 76 of U-shaped member 32. In order to facilitate the removal of cross-bar 34 from the end portions 62 and 76 of U-shaped member 32, knurled member 68 can be moved longitudinally along reduced portion 64 of cross-bar 34 against the pressure of spring 66, whereby pin 74 can be readily disengaged from aperture 70; and, in order to prevent knurled member 68 from becoming inadvertently disengaged from reduced portion 64, knurled member 68 is provided with a longitudinally extending slot 78 and reduced portion 64 of cross-bar is provided with a transversely extending pin 80 which extends through slot 78, both of which conjointly limit the extent of longitudinal movement of knurled member 68.

The spindle 36 includes two separable parts, a lower member or part 90 which is provided with the above mentioned flange or shoulder 38 and an upper member or part 94 which is suitably secured to cross bar 34 for example and not by way of limitation, by means of a screw 96. Said parts 90 and 94 are releasably coupled together by means of coupling means 98. Said parts 90 and 94 have longitudinally extending semi-cylindrical portions 100 and 102 which, when coupled together by the coupling means 98, form substantially a cylindrical member. Coupling means 98 includes a pin 104, or other suitable means, for effectively joining portions 90 and 94 by joining their respective semi-cylindrical portions 100 and 102, a knurled spindle locking sleeve or member 106 whose lateral movement along portion 94 and 90 is effectively limited at one end by compression spring 108 and at the other end by stop pin 110, which is fixed to part 100 and projects through an opening 118 in part 102. Pin 104 is fixed to part 100 and engages part 102 in an opening 114. A spring 108 is interposed between the sleeves 106 and the cross bar 34 and holds the overlapped portions 102 and 104 releasably against inadvertent disengagement. When the material holders are raised out of the receptacle 12, member 32 lifts the cover 13 off the top of the receptacle and supports said cover while the carrier is moved to a position over the next receptacle. An opening 19a in the cover enables the latter to move in relation to spindle 20 when the holders are lowered into the next receptacle.

It will be understood that the material holders 10 are placed on and removed from the rod part 90 of the carrier 14 when said part 90 is disengaged from part 94.

Referring now to the carrier 14A according to form of the invention illustrated in Figs. 6 to 8, the spindle or rod 36 is replaced by the rod 154 which is connected to the cross bar 34 by the screw 96. Rod 134 supports a carrier 156 provided with vertical channels 158 arranged peripherally about rod 154.

Channels or tracks 158 are substantially rectangularly shaped having a rear wall 160 which is suitably secured to the side of member 157 which is supported on said rod and two substantially parallel projecting sides 162 and 164. The remaining side of track 158 has a longitudinal slot 166 therethrough whereby two lip portions 168 and 170 project substantially parallel to side 160 from sides 162 and 164, respectively. The bottom of track 158 is suitably closed by means of a plate 159 and is opened at the top in order to facilitate insertion of a complementary laterally-enlarged end portion 172 of ear 174 provided on receptacle holder 10A. Holders 10A may be the same as holders 10 except that ears 174 of holders 10A have the laterally enlarged portion 172 in lieu of the apertures 17 of holders 10.

When ear 174 is inserted in track 158, the end portion 172 is engaged with side 160 of the track, and the shorter sides 178 and 180 of portion 172 are engaged with sides 162 and 164, respectively, of the track 158, and portion 182 projects through slot 166 of track 158. Flange portion 172 and track 158 are effective for the imparting to receptacle 10 reciprocating motion of the immersion apparatus when said flange 174 and track 158 are engaged. The manner in which cross-bar 34 is connected to U-shaped member 32 is exactly the same whether supporting spindle 154 is provided with tracks or whether supporting spindle 154 is constructed so as to have two portions readily attachable and detachable from each other.

Member 157 is provided with an aperture 186 through which spindle portion 154 passes for positioning thereon tracks 158. Provided on one end of spindle portion 154 is an internal thread for engagement with screw 96 whereby to couple spindle portion 154 to cross-bar 34. Provided on the other end of supporting spindle 154 is an enlarged portion or flange 188 of a diameter greater than the diameter of the aperture 186 provided in block 156 whereby to retain block 156 on the supporting spindle 154.

It will be understood that the carrier 14 or 14A may be utilized in immersion apparatus in which the material is turned as in U. S. Patents 2,341,197 and 2,341,198 or oscillated as U. S. Patent 2,583,379, or reciprocated vertically as in our U. S. patent application Serial No. 358,812. It will be noted that when the carriers 14 or 14A are used in apparatus which provides for vertical reciprocation of the tissue in the material holder 10 or 10A, the holders are advantageously movable longitudinally of the rods 36 or 154 so that the circulation of liquid through the holders in contact with the tissue specimens therein is to some extent probably improved by such movement.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent is:

1. In immersion apparatus having a receptacle for liquid, a carrier for a plurality of holders for the material to be immersed in the liquid in said receptacle, said carrier comprising a vertical member for supporting a plurality of the material holders, and a plurality of material holders releasably engageable with said carrier, each of said holders comprising a container provided with a lateral extension, said carrier comprising a vertical member and said extensions having openings through which said vertical member projects for releasably securing said holders to said carrier.

2. In immersion apparatus having a receptacle for liquid, a carrier for a plurality of holders for the material to be immersed in the liquid in said receptacle, said carrier comprising a vertical member for supporting a plurality of the material holders, and a plurality of material holders releasably engageable with said carrier, each of said holders comprising a container provided with a lateral extension, said carrier comprising a vertical member provided with a plurality of peripherally arranged vertical channels in each of which a plurality of the material holders may be secured in stacked relation, the extensions of said containers of the material holders being movably engageable in said channels and said containers projecting laterally from said channels, respectively.

3. In immersion apparatus having a receptacle for liquid, a carrier for a plurality of holders for the material to be immersed in the liquid in said receptacle, said carrier comprising a vertical member for supporting a plurality of the material holders, and a support from which said carrier depends, said carrier having separable parts and means for releasably securing them to each other, one of said parts being secured to said support and the other of said parts terminating in a free end when said parts are separated from each other, said free end providing for the mounting of said material holders on the carrier and the removal of said holders therefrom, said means for releasably securing said parts to each other comprising a sleeve slidable on said parts to a retaining position and movable to a releasing position, and means for releasably holding said sleeve in said retaining position.

4. In immersion apparatus having a receptacle for liquid, a carrier for a plurality of holders for the material to be immersed in the liquid in said receptacle, said carrier comprising a vertical member for supporting a plurality of the material holders, and a plurality of material holders releasably engageable with said carrier, each of said holders comprising a container provided with a lateral extension, said carrier comprising a vertical rod and said extensions on said holders having openings through which the rod projects for holding said holders laterally of said rod with a plurality of said material holders positioned laterally of each other about said rod.

5. In immersion apparatus having a receptacle for liquid, a carrier for a plurality of holders for the material to be immersed in the liquid in said receptacle, said carrier comprising a vertical member for supporting a plurality of the material holders, and a plurality of material holders releasably engageable with said carrier, each of said holders comprising a container provided with a lateral extension, said carrier comprising a vertical rod and said extensions on said holders having openings through which the rod projects for holding said holders laterally of said rod with a plurality of said material holders positioned laterally of each other about said rod, said rod comprising separable parts and means for releasably securing them to each other, one of said parts terminating in a free end when said parts are separated from each other, said free end providing for the mounting of said material holders on the carrier and the removal of said holders therefrom.

6. In immersion apparatus having a receptacle for liquid, a carrier for a plurality of holders for the material to be immersed in the liquid in said receptacle, said carrier comprising a vertical member for supporting a plurality of the material holders, and a plurality of material holders releasably engageable with said carrier, each of said holders comprising a container provided with a lateral extension, said carrier comprising a vertical rod and said extensions on said holders having openings through which the rod projects for holding said holders laterally of said rod with a plurality of said material holders positioned laterally of each other about said rod, said rod comprising separable parts and means for releasably securing them to each other, one of said parts terminating in a free end when said parts are separated from each other, said free end providing for the mounting of said material holders on the carrier and the removal of said holders therefrom, said means for releasably securing said parts to each other comprising a sleeve slidable on said parts to a retaining position and movable to a releasing position, and means for releasably holding said spring in said retaining position.

References Cited in the file of this patent

UNITED STATES PATENTS

| 1,236,832 | Frye | Aug. 14, 1917 |
| 2,102,868 | Waugh | Dec. 21, 1937 |
| 2,341,198 | Weiskopf | Feb. 8, 1944 |
| 2,369,592 | Marinsky et al. | Feb. 13, 1945 |
| 2,386,079 | Weiskopf | Oct. 2, 1945 |
| 2,539,802 | Weiskopf | Jan. 30, 1951 |